United States Patent Office 3,417,870
Patented Dec. 24, 1968

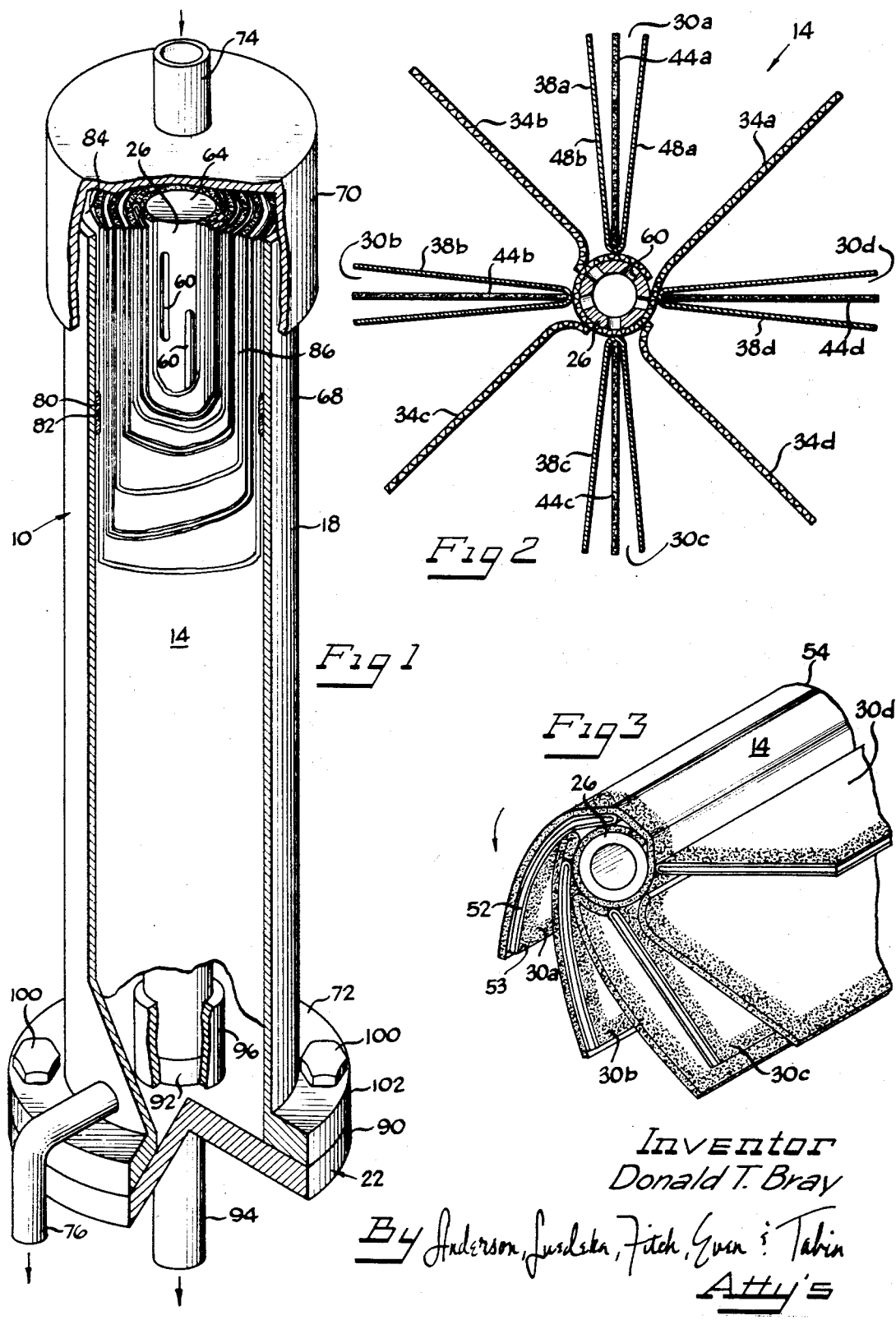

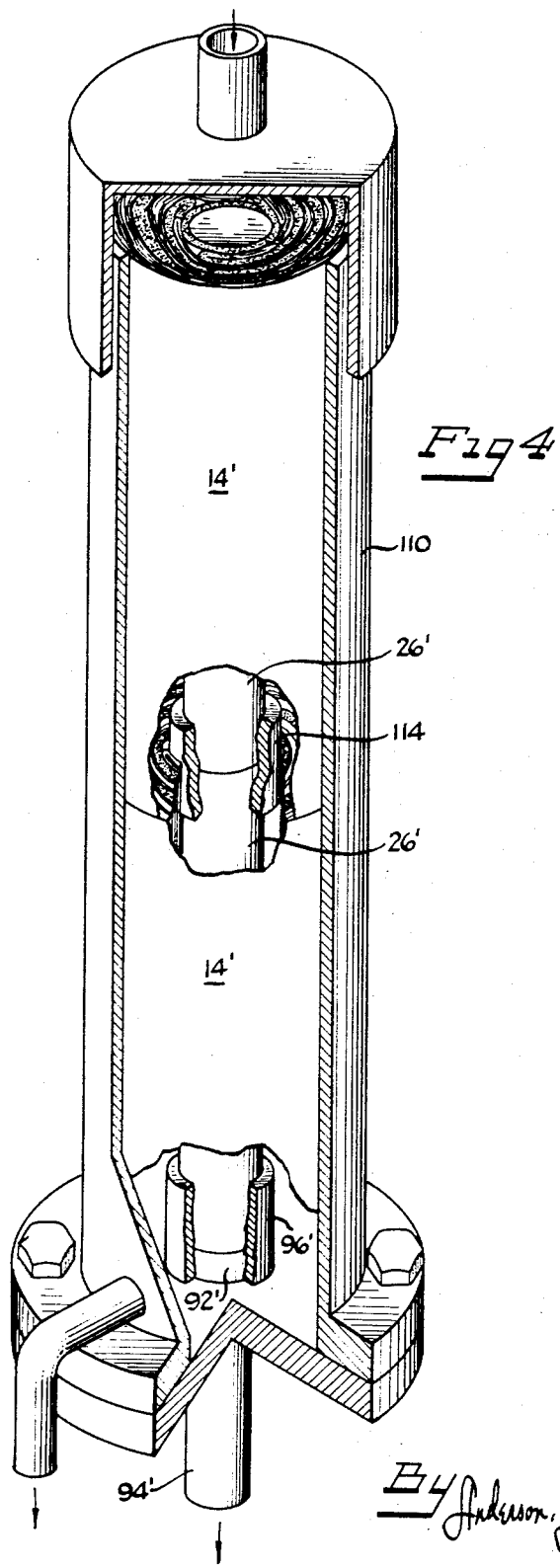

3,417,870
REVERSE OSMOSIS PURIFICATION APPARATUS
Donald T. Bray, San Diego, Calif., assignor, by mesne assignments, to Gulf General Atomic Incorporated, San Diego, Calif., a corporation of Delaware
Filed Mar. 22, 1965, Ser. No. 441,591
1 Claim. (Cl. 210—321)

ABSTRACT OF THE DISCLOSURE

A membrane module for use in apparatus for separating a first fluid component from a fluid mixture. A plurality of laterally coextensive leaves of sheetlike backing material extend outward from a hollow mandrel, each leaf being associated with a sheet of semipermeable membrane, and are spirally wound therewith around the mandrel in overlapping arrangement upon one another. Means, such as separator grid material, provides axially extending passageways between adjacent spiral windings for supply of the fluid mixture to be separated to the membrane surface. Illustrated is an apparatus using sheets of cellulose acetate material folded over glass felt and sealed along the edges with epoxy adhesive.

---

This invention resulted from work done in connection with the Office of Saline Water in the Department of the Interior, pursuant to the Saline Water Act, 42 U.S.C. 1951–1958g.

The present invention relates to an improved purification apparatus, and, more particularly, relates to an improved apparatus for efficiently purifying or concentrating a desired product. The present apparatus has relatively broad applicability in numerous fields, and is highly advantageous for use in desalinating brackish water or sea water.

Numerous devices have been proposed for desalinating brackish water or sea water. It is common knowledge that the provision of efficient apparatus for accomplishing this purpose has become of increasing importance in recent years as the world's population expands, as available reserves of fresh water become increasingly polluted due to various industrial processes, and as technology advances making constantly increasing demands on remaining quantities of pure water.

Evaporation processes directed toward the desalination of brackish water or sea water require a relatively high in put energy and in addition present problems due to the phase change of the liquid and high temperature corrosion and scaling. These factors result in a high cost of the pure water produced. Solar distillation apparatus has also generally proven to be not feasible in most instances due to the relatively large structures required, accompanied by considerable expense. Some electrical methods of purification utilizing ion removal procedures have also been proposed but generally have proven uneconomical when applied to large-scale desalination of sea water. Some apparatus employing the principles of osmosis have been employed and shown great promise. A pending application Ser. No. 419,881, filed on Dec. 21, 1964, and now Patent No. 3,367,504, by the assignee of the present application sets forth a method and apparatus for recovering purified water from sea water or concentrating a desired product by applying the principle of reverse osmosis and employing a spirally wound modular membrane, having a predetermined length.

However, the present module design sets forth an improved, considerably simplified structure, which does not employ a plurality of additional drain tubes as were often provided in the prior apparatus. Thus, no problems in adequately sealing the completed membrane structure are anticipated. At the same time an apparatus fabricated in accordance with the principles of the present invention provides a module structure, incorporating a relatively large membrane area, whereby increased amounts of purified water may be obtained. These advantages are generally achieved by the provision of a multi-leaf module, comprising a plurality of sandwich-like membrane leaves.

Accordingly, it is an object of the present invention to provide an improved apparatus for purifying a multi-component fluid or concentrating a desired product.

It is another object of the present invention to provide a simplified apparatus for the recovery of purified water from saline solutions by reverse osmosis.

It is another object of the present invention to provide a simplified apparatus for recovering purified water from brackish water or sea water or to concentrate a desired product by applying the principle of reverse osmosis and utilizing a semi-permeable membrane module in a manner so as to provide a large membrane surface area, through which purified water may diffuse, while minimizing the distance of product water flow.

It is still another object of the present invention to provide an apparatus for recovering purified water from brackish water or sea water or concentrating a desired product through an application of the principle of reverse osmosis and the employment of a simple modular membrane structure, which may be conveniently replaced at minimum expense.

Other objects and advantages of the present invention will become apparent when considered in conjunction with the accompanying drawings wherein:

FIGURE 1 is a perspective view, partially broken away of a preferred embodiment of a purification unit fabricated in accordance with the principles of the present invention;

FIGURE 2 is a plan view of a membrane layup as seen during an initial step in the fabrication of a membrane module of the purification unit illustrated in FIGURE 1;

FIGURE 3 is a partial persepctive view of the membrane layup of FIGURE 2 more particularly illustrating certain details in its fabrication; and FIGURE 4 is a persepctive view, partially broken away, of an alternative embodiment of a purification unit, incorporating more than one membrane module in a single pressure container.

The present invention generally sets forth an apparatus adapted for economically recovering purified water from brackish water or sea water in commercial quantities. The apparatus employed in accordance with the principles of the present invention applies the phenomenon commonly designated as reverse osmosis.

The process of osmosis generally defined as the diffusion proceeding through a semi-permeable membrane, typically separating two unequally concentrated solutions, which tends to equalize the concentration of the solutes in each solution. Generally an ideal semi-permeable membrane is one having a finite permeability for a predetermined component of a solution, for example, water while remaining totally impermeable to another component in the solution, for example, sodium chloride. During the process of osmosis, pure water typically diffuses from a first solution having a lower solute concentration through the semi-permeable membrane into a second solution having a higher solute concentration.

It has been found that the application of an elevated pressure relative to the pressure applied to the first solution restrains diffusion of the pure water through the membrane into the second solution. The osmotic pressure is that pressure at which diffustion into the second solution through an ideal semi-permeable membrane is substantially arrested. When the pressure applied to the second solution is further increased relative to that applied to the first solution, such that the osmotic pressure of the second solution is exceeded, reverse osmosis occurs. By virtue of this phenomenon pure water diffuses through the membrane into the first solution.

The particular pressure at which reverse osmosis occurs is generally dependent upon the composition of the particular solutions disposed on opposite sides of the semi-permeable membrane. For example, if ordinary sea water is disposed on one side of a suitable semi-permeable membrane and a relatively pure water solution is present on the other side reverse osmosis begins to occur, hwen the sea water is subjected to a pressure of approximately 350 pounds per square inch absolute. As a result pure water diffuses through the membrane from the sea water. If the total membrane surface area is relatively large and an appropriate means is provided for collecting the purified water substantial quantities of sea water or other such solutions may be purified on a relatively large scale.

Referring to the drawings, and particularly to FIGURE 1, there is provided a water purification unit 10 which includes an improved multi-leaf membrane module 14, a pressure tight enclosure 18 for containing the module, and a product water take off assembly 22. In addition FIGURES 2 and 3 illustrate the improved membrane module 14 during an initial stage of its fabrication in greater detail.

Generally the module 14 includes a central mandrel 26 which also serves as the product water collection means, or take off tube. A plurality of membrane sandwiches, only four of which are illustrated for the sake of clarity, 30a, 30b, 30c and 30d are interleaved between a corresponding number of strips of backing material 34a, 34b, 34c and 34d, which are suitably bonded to the central mandrel 26. The membrane sandwiches 30a, 30b, 30c and 30d each comprise a sheet of semi-permeable membrane material 38a, 38b, 38c and 38d folded backing upon itself, and a strip of separator grid material 44a, 44b, 44c and 44d, which is disposed intermediate each of the respective folds. The membrane sandwiches 30a, 30b, 30c and 30d are initially disposed about the central mandrel 26 in equally spaced relationship with each other in a leaf-like configuration as shown in FIGURE 2, preparatory, to spirally winding the sandwiches and the backing material tightly about the central mandrel 26.

In fabrication of the membrane module 14 one end of the sheet of the backing material 34a is initially tightly wound about substantially the entire circumferential surface of the central mandrel 26. The opposite end of the sheet 34a preferably extends radially from the mandrel 26 for a predetermined distance. The membrane sandwich 30a, comprising the folded sheet of membrane material 38a and the strip of separator material 44a, is disposed adjacent the radially extending portion of the sheet of backing material 34a such that its closed end, i.e., the fold line of the sheet of membrane material, is in contact with the portion of the backing material wound about the tube 26, and its fold 48a is adjacent the radially extending portion of the backing material 34a. The tube 26 is preferably rotated a predetermined angular distance so that the fold 48a of the sandwich 30a contacts the sheet 34a. A fluid-tight seal is provided along the outer edges 52, 53 and 54 of the area of contact between the fold 48a of the sandwich 30a and the radially extending portion of the backing material 34a by the disposition of a suitable adhesive at these regions. This provision serves to seal the backing material from communication with solutions, which have not initially passed through the membrane material, and also serves to provide a passageway through the backing material for the purified product water.

One end of the sheet of backing material 34b preferably is disposed on contact with the portion of the backing material 34a wound about the surface of the central mandrel 26. The other end of the sheet of backing material 34b extends radially outwardly therefrom. The sheet of backing material 34b is then placed in contact with a fold 48b of the sandwich 30a. A fluid-tight seal is provided between the backing material 34b and the fold 48b similar to that provided between the fold 48a and the backing material 34a through the corresponding disposition of a similar adhesive along the outer edges as shown. The opposite side of the backing material 34b is then sealed to one side of the membrane sandwich 30b. These seals preclude communication of the backing material with solutions which have not initially passed through the membrane material, and serve to provide another passageway through which the purified product water may flow.

The sandwich 30c is similarly bonded intermediate the sheet of backing material 34c and the sheet of backing material 34d. The sandwich 30d is then bonded at one side to the backing material 34d, and is bonded at its opposite side of the backing material 34a, thereby completing the leaved configuration, which is then wound about the mandrel 26. In this manner a desired number of sandwich leaves may be suitably bonded together and wound about a central mandrel to form a roll.

After the sandwich leaves have been bonded and wound in the leaved configuration, which is then wound about central mandrel, a layer of bonding material is applied along the outer edges of each of the strips of the product water side backing material 34a, 34b, 34c and 34d. The seal which is thus provided defines the product water passageway within the product water backing material, and precludes communication of the backing material with the solution which has not passed through the membranes and which is introduced into the area adjacent to the edges of the wrapped module. Generally the module structure is then completed by wrapping a plastic tape (not shown) about its exterior.

Each of the membrane folds together with its associated backing material, in effect, serves as a separate diffusion path for the purified water. Thus, a relatively large amount membrane surface is utilized, while the distance that the purified water, which has diffused through a particular fold of membrane material, must travel is maintained relatively short.

The semi-permeable membrane material, which comprises each of the membrane sandwiches, is generally in the form of a thin sheet of a material having predetermined permeation properties. For efficient desalination operation, for example, the membrane sheet is fabricated of a material exhibiting substantial salt rejection properties. One such material which has been found advantageous in such applications is a cellulose acetate membrane such as is disclosed in Loeb et al. U.S. Patent Nos. 3,133,132 and 3,133,137. However, a variety of other materials have also been developed, which exhibit substantial salt rejection properties.

The backing material is preferably fabricated of relatively thin sheets of a material having sufficiently high porosity to permit ready flow of product water therethrough, while being able to withstand substantial applied pressure without collapse or undue creep. In addition, the material is preferably sufficiently flexible so that it may be wound in a spiral configuration without fracturing. In certain instances, compaction of the material may occur accompanied by a corresponding reduction in porosity, when the material is subjected to relatively high pressures. Graphite cloth has been considered for use as the backing material but has generally proven to be too expensive for large scale application. Silicon carbide grit, properly sized, or sand particles properly sized, with the grains being held together with a suitable binder and disposed on a sheet of plastic felt has proven to be advantageous in many applications. In addition, various types of glass felt fabricated in the form of thin flexible sheets have proven advantageous in use.

In certain instances where it is anticipated that pressure of less than 500 p.s.i.a. are to be employed, a variety of fibrous plastic materials may advantageously be utilized as the backing material. Typical examples of such materials are nylon, polyester, rayon, rayon viscose, or acrylic fibers, which are unaffected by exposure to the fluid being processed and are adaptable to wetting by the adhesive being used.

The backing material generally serves as the flow channel leading to the collecting means, for the product water, which has diffused through the membrane material. The separator grid material, on the other hand, serves as a passageway for the feed water, or water to be purified. In operation, the feed water is conducted through the separator grid material in a direction generally parallel to the axis of the tube 26 and at right angles to the direction of flow of product water which flows laterally through the backing material toward the central tube 26. The separator grid material is preferably fabricated in relatively thin, flexible sheets so that it does not add undue thickness to the module, and may be readily wound in a spiral configuration. Generally, it is sufficient to employ a relatively inexpensive grid-like structure such as a plastic screen to serve as the separator grid material.

The central mandrel 26 is generally in the form of a self-supporting hollow tubular member provided with a plurality of randomly dispersed slots or apertures 60 on its outer circumference. These slots or apertures must, of course, be within the region encompassed by the adhesive, which binds the backing material to the mandrel 26. The mandrel 26 is preferably fabricated of a relatively corrosion resistant material, such as cellulose butyrate or extruded acrylic, since it is generally disposed in a relatively moist environment as the product water is supplied to it. As previously mentioned, one end of the backing material 34a is wound about substantially the entire outer circumference of the tube 26, while the other sheets of backing material 34b, 34c and 34d are disposed in contact with this initial winding. By virtue of such a disposition there is provided fluid communicaton between the slots 60 and the product water carried by the backing material. This provision permits the product water to flow into the hollow interior of the tube 26 from which it may be appropriately removed. The tube 26 is sealed at its upper end by a plug 64 tightly secured therein, so that fluid conducted into its interior may be directed toward the other end, and feed water is precluded from entry therein.

Since relatively high pressure are contemplated for use in conjunction with the apparatus described herein it is desirable to obtain adherent bonds which have sufficient strength to withstand the pressures. When cellulose acetate is utilized as the membrane material, a suitable adhesive for bonding together the edges of a membrane sandwich to the backing material has been found to be modified epoxy resin. Such adhesive material is generally compatible with the materials used and adequately wets them, forming a strong bond after curing is completed.

The pressure-tight enclosure 18 is preferably fabricated from a corrosion-resistant material such as copper, coated mild steel, stainless steel, fiber glass-reinforced epoxy or polyvinyl chloride. The enclosure 18 comprises a cylindrical outer shell 68 having a cap 70 secured to its upper end and a flange 72 secured to its lower end. The cap 70 and flange 72 are preferably secured to the shell by brazing, welding, etc. A feed inlet pipe 74 is disposed in a generally central location in the cap 70, and a waste outlet pipe 76 is disposed in the shell 68 adjacent the flange 72.

The internal diameter of the enclosure 18 is generally approximately equal to the outer diameter of the taped module 14. Thus, in some instances a sufficiently tight fit is provided between the module 14 and the enclosure 18 such that further seals are not needed. In certain other instances it is desirable to provide additional sealing, which may be advantageously accomplished by wrapping several turns of relatively narrow plastic tape (not shown) about a suitable region of the module 14. In those instances, where the spacing between the module 14 and the interior of the enclosure 18 is such that the above-described sealing means are not satisfactory, a low pressure seal is provided by disposing a grooved ring 80 about a suitable portion of the exterior of the module 14. The ring 80 is connected to the module 14 with an appropriate material, preferably silicon rubber adhesive. An O-ring 82 is disposed in the groove provided on the ring 80 to complete the seal.

By virtue of the seal provided by the above means the purification unit is divided into a feed compartment 84 and a purification compartment 86. Fluid, which is to be processed, is supplied through the inlet pipe 74 and is then directed from the feed compartment 84 through the passageways in the purification compartment 86, defined by the separator grid material.

Referring to FIGURE 1, the purification unit further includes the product water take off assembly 22. This assembly preferably includes a flange 90, having a nipple 92 disposed on its interior surface and a product water outlet pipe 94 on its exterior side, communicating with the nipple 92. A connector 96 such as a piece of rubber tubing, is disposed over the outwardly extending end of the nipple 92. The connector 96 is also disposed over the lower end of the tube 26. In this fashion fluid communication is provided between the interior of the tube 26 and the product water outlet pipe 94. The take off assembly 22 is preferably secured to the flange 72 by a plurality of bolts 100, extending through the flange 90 and the flange 72. In addition, a gasket 102 is disposed intermediate the flanges 72 and 90 to provide a fluid-tight seal.

Although the apparatus described above may be employed for treating a variety of solutions, it is particularly adapted for the treatment of saline solutions such as sea water and for the sake of simplicity its operation is described in terms thereof. To further facilitate the description of such treatment, reference is made to the arrows shown in FIGURE 1, depicting directions of flow. In operation, sea water is supplied to the feed compartment 84 through the feed inlet pipe 74 from which it flows downwardly through the purification compartment 86. More specifically, the sea water flows through the passageways in the leaves of the membrane module 14 defined by the separator grid material. After completion of its passage therethrough, the sea water, which has been depleted of a portion of its original water content, is discharged from the purification unit 10 through the waste outlet pipe 76. The material discharged through the waste outlet pipe 76 is hereinafter referred to as "sea water residue."

The sea water is preferably maintained at a predetermined pressure throughout its residence time in the purification unit 10. This pressure is in excess of that sufficient to cause reverse osmosis to occur, i.e., to cause diffusion of pure water from the sea water through the semi-permeable material into the backing material. This is advantageously achieved by employing a suitable pump (not illustrated) for supplying sea water to the purification unit 10 and providing an appropriate pressure control valve (not illustrated) in the waste outlet pipe 76 so as to adjust the pressure of the sea water present in the purification compartment 86. The pump is preferably adjusted to provide a relatively constant flow of sea water through the purification compartment 86. Such a provision is desirable for promoting the maintenance of an equilibrium salt concentration.

As previously mentioned, substantially purified product water generally diffuses through the folds of the semi-permeable membrane sheet comprising each of the sandwiches as the sea water flows through the passageways defined in each of the sandwiches by the separator grid material. This product water diffuses into the sheets of backing material disposed intermediate the respective folds of adjoining membrane sandwiches, and thereupon flows laterally through the sheets of backing material until it reaches the portion of the backing material 34a wound about the tube 26. At this point, the product water flows into the hollow interior of the tube 26 through the slots 60, positioned about the outer circumferential surface of the tube 26. Upon reaching the hollow interior of the tube 26 the product water flows out through the open end of the tube 26, through the take off assembly 22, and through the product water outlet pipe 94.

The product water which flows through the backing material experiences a drop in pressure from the point where it diffuses through the semi-permeable membrane to the point where it reaches the tube. This pressure drop is generally proportional to the square of the distance the water must flow and inversely proportional to the square of the effective hydraulic diameter of the pores in the backing material, providing the volumetric flow per unit area of the membarne is substantially constant. It is accordingly desirable to provide a backing material having relatively large sized pores to minimize such pressure drops. But, since the backing material also serves to support the membrane sheets, the pores cannot be so large as to permit the membrane to be forced into and through the pores. It is also desirable for efficient operation to utilize a membrane module having as large a membrane surface area as possible in order to increase the production of purified water. By virtue of the structure described herein these objectives are substantially achieved. Since each of the sandwich leaves need not be more than about two feet in length, the pressure drop developed in accordance with the distance traversed by the product water is substantially minimized, and is generally acceptable from an engineering standpoint. In addition, the amount of membrane surface available for effecting the production of purified water may be maximized without increasing the distance through which the product water flows, since the product water traverses substantially the same distance through the backing material intermediate adjacent folds of adjoining sandwich leaves regardless of the total number of membrane sandwiches employed in the apparatus. Thus, a module may be provided, having a desired membrane area by using an appropriate number of membrane sandwiches, limited only by the relatively small width of each of the leaved membrane sandwiches.

In many applications it may be advantageous to employ a plurality of purification units constructed in accordance with the principles of the present invention, as described above. Such units are suitably interconnected with the pump means at their respective inlet pipes and with appropriate head connections at their respective outlet pipes, thereby forming a water desalination apparatus adapted for providing substantial quantities of desalinated water on a commercial scale.

In certain instances it is desirable to dispose a plurality of membrane modules in a single pressure tight enclosure. An alternative embodiment of the purification apparatus is shown in FIGURE 4, illustrating two membrane modules in a single enclosure, although more than two may be readily employed. (Elements corresponding to elements previously described in connection with FIGURES 1, 2 and 3 are identified by the same reference numerals with a prime (') symbol.)

The membrane modules 14' are generally similar to those described above and are disposed within the pressure-tight enclosure 110. The modules 14' are disposed in series relationship with each other such that the feed solution passes directly from one module to the next. The central mandrels 26' which receive the purified water are maintained in fluid communication with each other by interconnections preferably provided by short pieces of rubber tubing 114. Thus, in effect the interconnected mandrels 26' define a continuous, elongated product water take off tube. Communication between the product water outlet pipe 94' and the final mandrel is again preferably provided by disposing the piece of tubing 96' about the end of the mandrel 26' and the nipple 92'. If desired, the multiple module purification apparatus may also be fabricated by spirally winding a plurality of axially spaced membrane structures about a single elongated mandrel.

Alternatively, it may be advantageous in some applications to dispose a plurality of membrane modules in parallel relationship within a suitable pressure-tight enclosure. In such an apparatus the mandrels are connected to a suitable header arrangement, which communicates with the take off assembly in the pressure-tight enclosure.

Preferably, the individual multileaf membrane modules 14, which are to be employed, are prefabricated, and the interconnections between the plurality of purification units, comprising the desalination plant, are arranged so as to facilitate periodic shut down of individual purification units without disturbing the operation of the remaining units, thereby permitting convenient replacement of the individual membrane modules. Such a provision is desirable because the finite useful life of the membrane modules may necessitate replacement of the individual membrane module assemblies. Thus, the particular modular construction described, permitting convenient and economical replacement of the individual membrane modules gives rise to numerous advantages. A desalination plant fabricated in accordance with the modular design described herein will typically prove to be highly durable and adaptable for numerous applications. It is anticipated that maintenance costs will be relatively low by virtue of such a design, since only a single purification unit is effected in case of membrane failure, for example, and a complete plant shut down is not required for replacement of a defective membrane module. In addition, the use of prefabricated modules minimizes the costs required for module replacement.

As previously indicated, the present apparatus is readily adaptable for use in concentrating a particular aqueous solution as well as for producing purified water. To accomplish such concentration procedures it is merely necessary to provide a means for collecting or receiving the more concentrated solution previously designated as the sea water residue. In such instances the purified water comprises the waste product and may either be collected for use as a by-product or disposed of, while the desired, more concentrated solution from which the purified water has been removed comprises the product.

Thus, there has been provided an improved and simplified apparatus for the recovery of purified water from brackish water or sea water or for the concentration of a particular aqueous solution, having desirable economy of operation and maintenance and durability in use.

It will be understood that various modifications and changes will be apparent to those skilled in the art from the foregoing description. Such modifications are deemed to be within the scope of the appended claims.

Various features of the present invention are set forth in the following claims:

What is claimed is:

1. Apparatus including a membrane module for use in reverse osmosis of multicomponent fluids wherein selected components of said fluids are separated from the remaining portion of said fluids by contacting a reverse osmosis membrane with said fluids at a pressure greater than osmotic pressure for said fluids comprising, a hollow mandrel having axial passageway means provided therein, a layer of first porous backing material adjacent to and surrounding said mandrel, a plurality of generally laterally coextensive leaves of sheet-like porous backing material, in contact with and extending generally radially outward from said first backing material, said leaves having at least one edge thereof in a generally parallel relationship to the longitudinal axis of said mandrel, a plurality of semipermeable reverse osmosis membrane sheets each having a fold line therein, said fold line being positioned in contact with said first porous backing material in a generally parallel relationship to the longitudinal axis of said mandrel, and each positioned between two of said leaves of sheet-like porous backing material, a plurality of separator grid sheets each positioned within the folds of said membranes to form a fluid conducting passageway within each of said folds, said pluralities of sheet-like porous backing material, membranes and separator grids being spirally wound around said first porous backing material in overlapping relationship upon one another to form a roll comprising multiple layers of porous backing material-membrane-fluid conducting passageway-membrane groupings, means to supply feed fluid to one end of said fluid conducting passageways, means to withdraw fluid from the opposite end of said passageways, and means to withdraw fluid from said hollow mandrel.

References Cited

UNITED STATES PATENTS

| | | | |
|---|---|---|---|
| 3,367,504 | 2/1968 | Westmoreland | 210—321 |
| 2,599,604 | 6/1952 | Bauer et al. | 210—494 |
| 2,650,709 | 9/1953 | Rosennak et al. | 210—321 |
| 2,756,206 | 7/1956 | Gobel | 210—321 |
| 3,171,808 | 3/1965 | Todd | 210—321 |
| 3,173,867 | 3/1965 | Michaels | 210—321 |
| 3,252,272 | 5/1966 | Hazen et al. | 55—158 |

FOREIGN PATENTS

| | | |
|---|---|---|
| 1,328,826 | 4/1963 | France. |
| 489,654 | 8/1938 | Great Britain. |

OTHER REFERENCES

Osburn, J. O. and Kammermeyer, K.: "New Diffusion Cell Design," Industrial and Engineering Chemistry, vol. 46, No. 4, pp. 739–742.

REUBEN FRIEDMAN, *Primary Examiner.*

W. S. BRADBURY, *Assistant Examiner.*

U.S. Cl. X.R.

210—494